United States Patent
Guidotti et al.

(10) Patent No.: US 10,308,734 B2
(45) Date of Patent: Jun. 4, 2019

(54) CATALYST COMPONENTS FOR THE POLYMERIZATION OF OLEFINS AND CATALYSTS THEREFROM OBTAINED

(71) Applicant: Basell Poliolefine Italia S.r.l., Milan (IT)

(72) Inventors: Simona Guidotti, Ferrara (IT); Simona Esposito, Ferrara (IT); Dario Liguori, Ferrara (IT); Giampiero Morini, Ferrara (IT); Fabrizio Piemontesi, Ferrara (IT); Gianni Vitale, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 464 days.

(21) Appl. No.: 14/431,590

(22) PCT Filed: Sep. 25, 2013

(86) PCT No.: PCT/EP2013/069927
§ 371 (c)(1),
(2) Date: Mar. 26, 2015

(87) PCT Pub. No.: WO2014/048964
PCT Pub. Date: Apr. 3, 2014

(65) Prior Publication Data
US 2015/0259443 A1    Sep. 17, 2015

Related U.S. Application Data

(60) Provisional application No. 61/706,708, filed on Sep. 27, 2012.

(30) Foreign Application Priority Data

Sep. 26, 2012  (EP) .................... 12186108

(51) Int. Cl.
| | | |
|---|---|---|
| B01J 23/00 | (2006.01) |
| C08F 4/65 | (2006.01) |
| C08F 10/06 | (2006.01) |
| C08F 4/654 | (2006.01) |
| B01J 23/06 | (2006.01) |
| B01J 27/04 | (2006.01) |
| B01J 37/00 | (2006.01) |

(52) U.S. Cl.
CPC ............ *C08F 10/06* (2013.01); *C08F 4/6543* (2013.01); *B01J 23/06* (2013.01); *B01J 27/04* (2013.01); *B01J 37/0036* (2013.01)

(58) Field of Classification Search
CPC ....... B01J 23/06; B01J 37/0036; C08F 4/6543
USPC ................. 502/342, 343; 526/113
See application file for complete search history.

(56) References Cited

U.S. PATENT DOCUMENTS

| | | | | |
|---|---|---|---|---|
| 4,238,355 A * | 12/1980 | Shipley | ................... | C08F 10/00 502/115 |
| 4,370,456 A | 1/1983 | George | | |
| 4,617,284 A * | 10/1986 | Matsuura | ................ | C08F 10/00 502/104 |
| 5,936,049 A * | 8/1999 | Kojoh | ..................... | C08F 10/00 502/104 |
| 6,818,583 B1 * | 11/2004 | Morini | .................... | C08F 10/00 502/103 |
| 6,855,655 B2 | 2/2005 | Wagner et al. | | |
| 6,870,022 B2 * | 3/2005 | Iwasaki | ................... | C08F 10/00 526/123.1 |
| 7,723,254 B2 * | 5/2010 | Tanase | .................... | C07F 3/003 502/104 |
| 8,940,653 B2 * | 1/2015 | Collina | .................. | C08F 10/00 502/125 |
| 2007/0219326 A1 | 9/2007 | Tanase et al. | | |
| 2009/0181845 A1 | 7/2009 | Tanase et al. | | |
| 2013/0197172 A1 | 8/2013 | Collina et al. | | |

FOREIGN PATENT DOCUMENTS

| | | |
|---|---|---|
| EP | 1775309 A1 | 4/2007 |
| JP | 2003261612 A | 9/2003 |
| RU | 2287535 C2 | 11/2006 |
| WO | WO-2012041944 A1 | 4/2012 |

* cited by examiner

*Primary Examiner* — Rip A Lee

(57) ABSTRACT

Catalyst components component for the (co)polymerization of olefins $CH_2$=CHR, in which R is a hydrocarbyl radical with 1-12 carbon atoms, optionally in mixture with ethylene, comprising Ti, Mg, Zn, Cl, and an electron donor compound characterized by the fact that more than 50% of the titanium atoms are in the +4 valence state, and that the amount of Zn ranges from 0.1 to 4% by weight based on then total weight of said solid catalyst component.

17 Claims, 3 Drawing Sheets

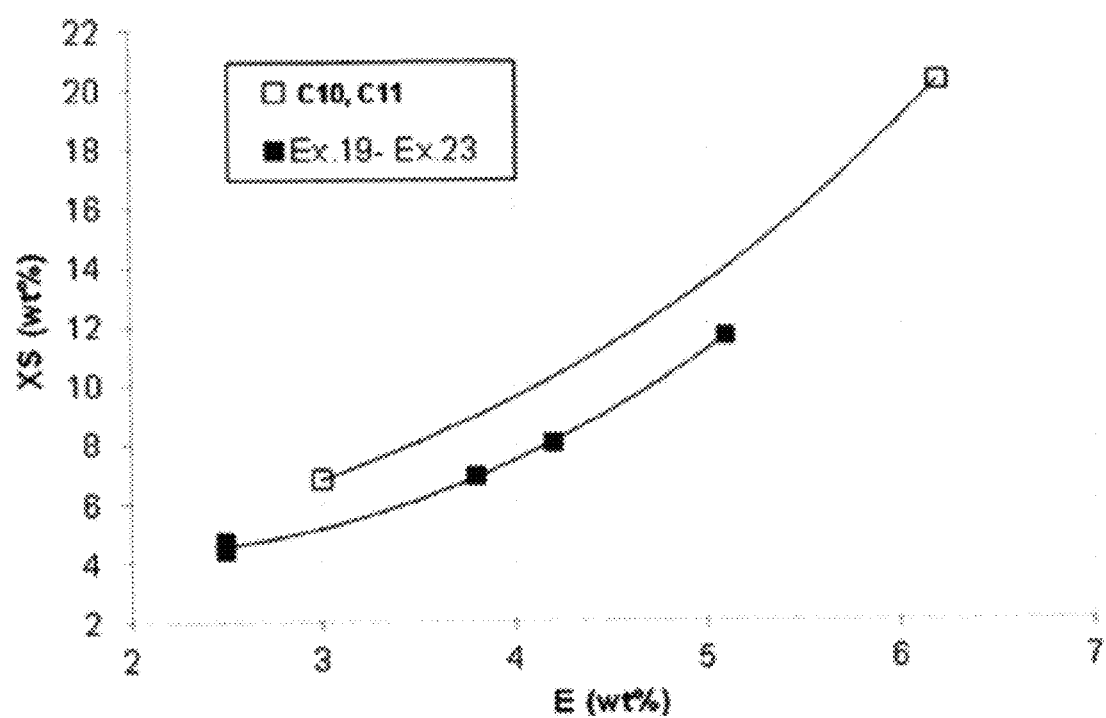
Fig. 1. Xylene soluble fraction as a function of raco composition (ethylene wt%) for the copolymers from Ex. 19 to Ex. 23 (■) and for comparative examples C10 and C11 (□).

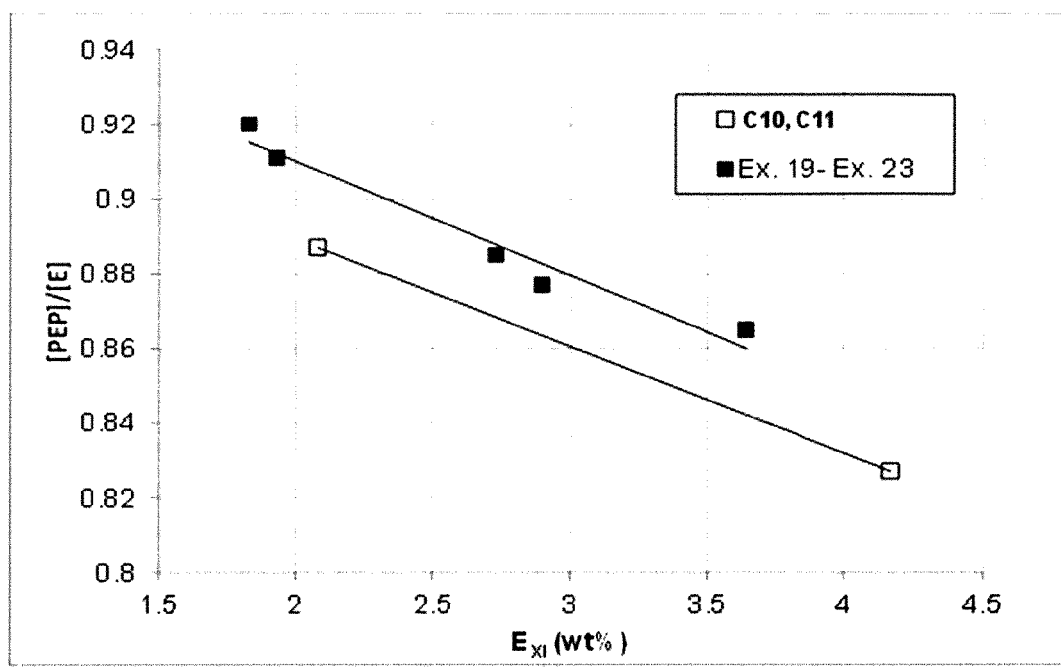
[0002] Fig. 2. Fraction of isolated ethylene with respect to total ethylene in the o-xylene insoluble fraction (XI) as a function of XI fraction composition (ethylene wt%) for the copolymers from Ex. 19 to Ex. 23 (■) and for comparative examples C8 and C9 (□).

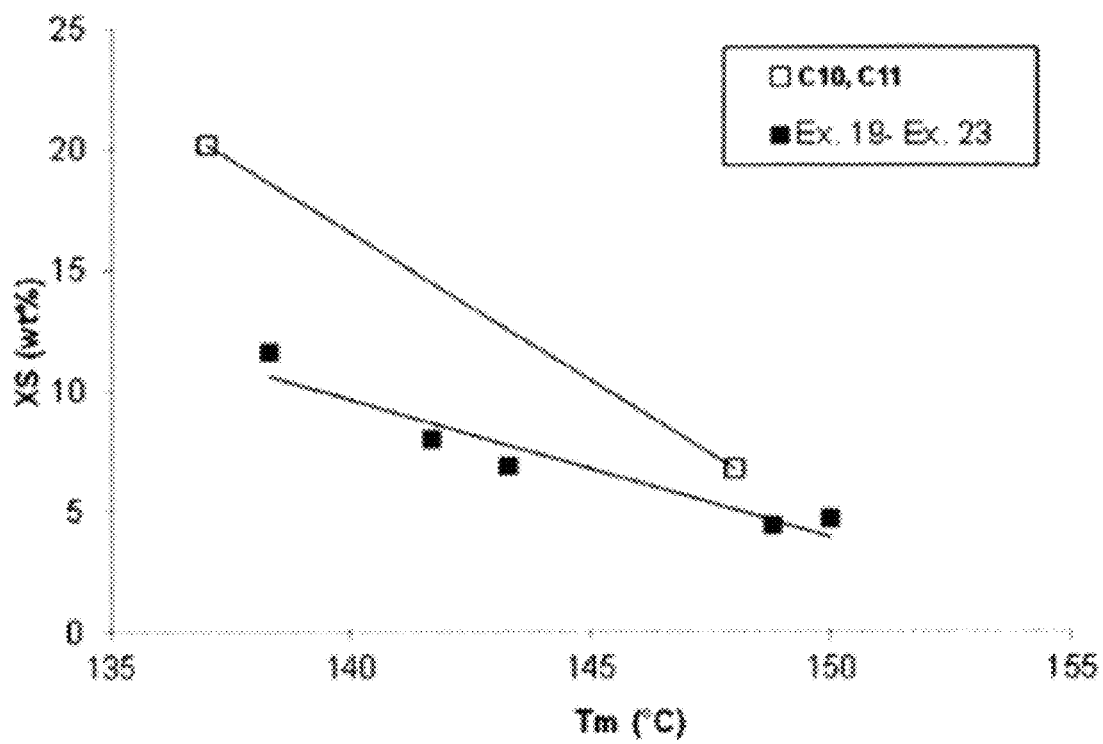
Fig. 3. Xylene soluble fraction as a function of the melting temperature (peak in the second melting DSC curve) of copolymers from Ex. 19 to Ex. 23 (■) and of comparative examples C8 and C9 (□).

CATALYST COMPONENTS FOR THE POLYMERIZATION OF OLEFINS AND CATALYSTS THEREFROM OBTAINED

This application is the U.S. National Phase of PCT International Application PCT/EP2013/069927, filed Sep. 25, 2013, claiming benefit of priority to European Patent Application No. 12186108.2, filed Sep. 26, 2012, and benefit of priority under 35 U.S.C. § 119(e) of U.S. Provisional Application No. 61/706,708 filed Sep. 27, 2012, the contents of which are incorporated herein by reference in their entirety.

FIELD OF THE INVENTION

The present invention relates to catalyst components for the polymerization of olefins, in particular propylene, comprising a Mg, Zn, Ti and halogen elements and at least an electron donor compound. The present invention further relates to the catalysts obtained from said components and to their use in processes for the (co)polymerization of olefins in particular propylene.

BACKGROUND OF THE INVENTION

Catalyst components for the stereospecific polymerization of olefins, such as propylene, are widely known in the art and they are of the Ziegler-Natta category type. The first catalyst of this type widely used in the industry was based on the use of solid $TiCl_3$ obtained by reduction of $TiCl_4$ with aluminum alkyls. The activity and stereospecificity of the catalysts were not so high so that the polymer had to be subject to a deashing treatment to remove the catalyst residues and to a washing step for removing the atactic polymer produced. Nowadays, the most spread out catalyst family used industrially comprises a solid catalyst component, constituted by a magnesium dihalide on which are supported a titanium compound and an internal electron donor compound, used in combination with an Al-alkyl compound. The titanium atoms in the solid catalyst component have a +4 oxidation state. Conventionally these catalysts are used together with an external donor (for example an alkoxysilane) which helps in obtaining higher isotacticity. One of the preferred classes of internal donors is constituted by the esters of phthalic acid, diisobutylphthalate being the most used. The phthalates are used as internal donors in combination with alkylalkoxysilanes as external donor. This catalyst system is capable of giving good performances in terms of activity, and propylene polymers with high isotacticity and xylene insolubility. It is however of general interest the possibility of increasing the xylene insolubility particularly for catalyst components based on donors different from phthalates. These latter in fact generated some health concerns in the industry and, as a consequence, alternatives classes of donors are being evaluated. It has been generally noted that the alternative classes of donors tend to generate catalysts slightly less stereospecific which in propylene polymerization produces a lower amount of polymer fraction insoluble in xylene. In principle it is possible increasing the stereospecificity by increasing the amount of donor in the catalyst. However, as a downside, the polymerization activity decreases and the balance activity/stereospecificity worsens anyhow.

Based on this, it would be very convenient to find a way of improving the stereospecificity of a catalyst without decreasing its activity and in particular it would be convenient that this method be of a wide applicability.

Since the discovery of magnesium chloride based supports numerous attempts have been made to include in it additional compounds with the aim of imparting new or modified properties to the final catalysts.

In U.S. Pat. No. 4,613,655 substantial amounts (30% by weight or higher) of different inorganic compounds and, among them ZnO and $ZnCl_2$, are mixed with $MgCl_2$ and then ground in the presence of $TiCl_4$ salts in order to produce a catalyst. Apart from the effect of dilution of $MgCl_2$, the catalyst did not show any improvement in polymerization activity.

An increase in polymerization activity is reported by Fregonese and Bresadola (catalyst system supported on $MgCl_2$ doped with $ZnCl_2$ for olefin polymerization—Journal of Molecular Catalysis A: Chemical 145 (1999) p. 265-271) that discloses the preparation of a catalyst support by mixing metallic Mg and up to 2% of metallic Zn and subsequent reaction with n-BuCl. The so obtained support contains $MgCl_2$ in δ-form and $ZnCl_2$ but also contains a substantial amount of metal-alkyl groups (Table 1). These latter, which appear reduced in amount after reaction with $TiCl_4$ are responsible for the presence of titanium atoms in the reduced +3 oxidation state. In propylene and ethylene polymerization the catalyst shows an increased activity up to about 2% of Zn content; however, the effect on stereospecificity is minimal as the amount of boiling heptane insoluble fraction remains always below 90% and when the amount of Zn approaches 2% wt the heptane insoluble fraction dramatically drops to less than 80%.

On the other hand, higher amounts of $ZnCl_2$ generates, according to CN 1631922, a catalyst, having a support containing mixed Mg—Zn halides in which $ZnCl_2$ constitutes more than 15% based on the total of Mg—Zn halides on which are supported Ti atoms and an electron donor, capable of polymerizing vinyl aromatic monomers such as styrene. Interesting results in ethylene/styrene copolymerization are obtained only when the amount of $ZnCl_2$ used in support preparation was higher than the amount of $MgCl_2$.

Now the applicant has found that it is possible to increase the stereospecific response of catalyst component based on Mg containing support on which are supported titanium atoms and donors by modifying it with specific amounts of Zn compounds and by the proper selection of Ti species.

SUMMARY OF THE INVENTION

It is therefore an object of the present invention a solid catalyst component comprising Ti, Mg, Zn, Cl, and an electron donor compound characterized by the fact that more than 50% of the titanium atoms are in the +4 valence state, and that the amount of Zn ranges from 0.1 to 4% based on then total weight of said solid catalyst component.

BRIEF DESCRIPTION OF THE DRAWINGS

FIG. 1 Represents a plot of the xylene soluble fraction as a function of raco composition (ethylene wt %) for the copolymers from Ex. 19 to Ex. 23 (■) and for comparative examples C10 and C11 (□).

FIG. 2 Represents a plot of the fraction of isolated ethylene with respect to total ethylene in the o-xylene insoluble fraction (XI) as a function of XI fraction composition (ethylene wt %) for the copolymers from Ex. 19 to Ex. 23 (■) and for comparative examples C8 and C9 (□).

FIG. 3 shows a xylene soluble fraction as a function of the melting temperature (peak in the second melting DSC curve) of copolymers from Ex. 19 to Ex. 23 (■) and of Comparative Examples C8 and C9 (□).

DETAILED DESCRIPTION OF THE INVENTION

Preferably, in the catalyst of the present invention the amount of Zn ranges from 0.2 to 3.5% and especially from 0.2 to 3% by weight. The Zn/Mg molar ratio can range from 0.001 to 0.05 preferably from 0.004 to 0.03.

Preferably, more than 60% and more preferably more than 70% of the titanium atoms are in +4 valence state.

The total amount of Ti is typically higher than 0.8% and more preferably in the range 1.1-2.5% wt.

The particles of solid component have substantially spherical morphology and average diameter comprised between 5 and 150 µm, preferably from 20 to 100 µm and more preferably from 30 to 90 µm. As particles having substantially spherical morphology, those are meant wherein the ratio between the greater axis and the smaller axis is equal to or lower than 1.5 and preferably lower than 1.3.

The Mg atoms preferably derive from magnesium chloride, preferably from magnesium dichloride and more preferably from magnesium dichloride in active form meaning that it is characterized by X-ray spectra in which the most intense diffraction line which appears in the spectrum of the non-active chloride (lattice distanced of 2.56 Å) is diminished in intensity and is broadened to such an extent that it becomes totally or partially merged with the reflection line falling at lattice distance (d) of 2.95 Å. When the merging is complete the single broad peak generated has the maximum of intensity which is shifted towards angles lower than those of the most intense line.

The titanium atoms preferably derive from titanium compounds of formula $Ti(OR)_nX_{4-n}$ in which n is comprised between 0 and 4; X is halogen and R is an hydrocarbon radical, preferably alkyl, radical having 1-10 carbon atoms or a COR group. Among them, particularly preferred are titanium compounds having at least one Ti-halogen bond such as titanium tetrahalides or halogenalcoholates. Preferred specific titanium compounds are $TiCl_4$, and $Ti(OEt)Cl_3$.

The components of the invention also comprise an electron donor compound (internal donor), selected from esters, ethers, amines, silanes and ketones or mixtures thereof. Particularly preferred classes are alkyl and aryl esters of optionally substituted aromatic mono or polycarboxylic acids such as for example esters of benzoic and phthalic acids, and esters of aliphatic acids selected from malonic, glutaric, succinic and maleic acids. Specific examples of esters of aromatic mono or polycarboxylic acids are n-butylphthalate, di-isobutylphthalate, di-n-octylphthalate, ethyl-benzoate and p-ethoxy ethyl-benzoate. Among esters of aliphatic acids, preferred are the polycarboxylic acids such as malonates and glutarates. Moreover also preferred are the (S,S), (R,R) or meso forms of the succinates of formula (I) below

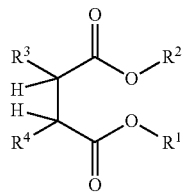

in which the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, cycloalkyl, aryl, arylalkyl or alkylaryl group, optionally containing heteroatoms with the proviso that at least one of them is a branched alkyl.

Moreover, also the diesters disclosed in WO2010/078494 and U.S. Pat. No. 7,388,061 can be used. Among this class, particularly preferred are the 2,4-pentanediol dibenzoate derivatives.

Moreover, can be advantageously used also the 1,3 diethers of the formula (II):

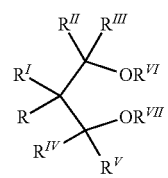

wherein R, $R^I$, $R^{II}$, $R^{III}$, $R^{IV}$ and $R^V$ equal or different to each other, are hydrogen or hydrocarbon radicals having from 1 to 18 carbon atoms, and $R^{VI}$ and $R^{VII}$, equal or different from each other, have the same meaning of R-$R^V$ except that they cannot be hydrogen; one or more of the R-$R^{VII}$ groups can be linked to form a cycle. The 1,3-diethers in which $R^{VI}$ and $R^{VII}$ are selected from $C_1$-$C_4$ alkyl radicals are particularly preferred.

Preferably, the final amount of electron donor compound in the solid catalyst component ranges from 1 to 25% by weight preferably in the range from 3 to 20% by weight.

The Zn atoms preferably derive from one or more Zn compounds not having Zn-carbon bonds. In particular the Zn compounds can be selected from Zn halides, Zn carbonate, Zn acetate, Zn nitrate, Zn oxide, Zn sulphate, Zn Sulfide. Among Zn halides, preferred are Zn dichloride and Zn bromide. The most preferred Zn compounds are Zn oxides and Zn dichloride.

The preparation of the solid catalyst component can be carried out according to several methods.

According to one of these methods, the magnesium dichloride in an anhydrous state, the titanium compound, the Zn compound and the electron donor compounds are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound, the Zn compound and the electron donor compounds are treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. Any Zn compound of the invention can be used in the comilling technique, and ZnO and $ZnCl_2$ are the most preferred. When using the milling technique for preparing the catalyst component the final amount of Zn preferably range from 0.1 to 1.5% by weight and the preferred internal donors are the alky esters of phthalic acids.

According to another preferred method, the solid catalyst component can be prepared by reacting a titanium compound of formula $Ti(OR)_{q-y}X_y$, where q is the valence of titanium and y is a number between 1 and q, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride, operating under stirring conditions at the melting temperature of the adduct (100-130° C.). Then, the adduct is mixed with an inert hydrocarbon immiscible with the adduct thereby creating an emulsion which is quickly quenched causing the solidification of the adduct in form of spherical particles. Examples of spherical adducts prepared according to this procedure are described in U.S. Pat. Nos. 4,399,054 and 4,469,648. The so obtained adduct can be directly reacted with Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The electron donor compound is added in the desired ratios during the treatment with $TiCl_4$. Several ways are available to add the Zn compound. According to one option, the Zn compound is incorporated directly into the $MgCl_2 \cdot pROH$ adduct during its preparation. In particular, the Zn compound can be added at the initial stage of adduct preparation by mixing it together with $MgCl_2$ and the alcohol. Alternatively, it can be added to the molten adduct before the emulsification step. Preferred Zn compound to be added to the Ti compound is $ZnCl_2$ while for incorporation directly into the $MgCl_2 \cdot pROH$ adduct both $ZnCl_2$ and ZnO are equally preferred. When using ZnO it is preferred although not strictly necessary use it in very small particle size and in particular in the form of nano particles i.e, particles having at least one dimension in the range of nanometers. When preparing the catalyst according to this procedure the final amount of Zn is preferably in the range of 0.1-2% by weight.

The preparation of catalyst components in spherical form are described for example in European Patent Applications EP-A-395083, EP-A-553805, EP-A-553806, EPA601525 and WO98/44001.

The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10.000 Å generally ranges from 0.3 to 1.5 $cm^3/g$, preferably from 0.45 to 1 $cm^3/g$.

The solid catalyst component has an average particle size ranging from 5 to 120 μm and more preferably from 10 to 100 μm.

As mentioned, in any of these preparation methods the desired electron donor compounds can be added as such or, in an alternative way, can be obtained in situ by using an appropriate precursor capable of being transformed in the desired electron donor compound by means, for example, of known chemical reactions such as etherification, alkylation, esterification, transesterification etc.

Regardless of the preparation method used, the final amount of the electron donor compound is such that its molar ratio with respect to the $TiCl_4$ is from 0.01 to 2, preferably from 0.05 to 1.2.

The solid catalyst components according to the present invention are converted into catalysts for the polymerization of olefins by reacting them with organoaluminum compounds according to known methods.

In particular, an object of the present invention is a catalyst for the polymerization of olefins $CH_2=CHR$, in which R is a hydrocarbyl radical with 1-12 carbon atoms, optionally in mixture with ethylene, comprising the product obtained by contacting:

(i) the solid catalyst component as disclosed above and
(ii) an alkylaluminum compound and,
(iii) an external electron donor compound.

The alkyl-Al compound (ii) is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides, such as $AlEt_2Cl$ and $Al_2Et_3Cl_3$, possibly in mixture with the above cited trialkylaluminums.

Suitable external electron-donor compounds include silicon compounds, ethers, esters, amines, heterocyclic compounds and particularly 2,2,6,6-tetramethylpiperidine and ketones.

Another class of preferred external donor compounds is that of silicon compounds of formula $(R_6)_a(R_7)_bSi(OR_8)_c$, where a and b are integers from 0 to 2, c is an integer from 1 to 4 and the sum (a+b+c) is 4; $R_6$, $R_7$, and $R_8$, are alkyl, cycloalkyl or aryl radicals with 1-18 carbon atoms optionally containing heteroatoms. Particularly preferred are the silicon compounds in which a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$ alkyl group, in particular methyl. Examples of such preferred silicon compounds are methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, methyl(3,3,3-trifluoro-n-propyl)dimethoxysilane. Moreover, the silicon compounds in which a is 0, c is 3, $R_7$ is a branched alkyl or cycloalkyl group, optionally containing heteroatoms, and $R_8$ is methyl are also preferred. Examples of such preferred silicon compounds are cyclohexyltrimethoxysilane, t-butyltrimethoxysilane and thexyltrimethoxysilane.

The electron donor compound (iii) is used in such an amount to give a molar ratio between the organoaluminum compound and said electron donor compound (iii) of from 0.1 to 500, preferably from 1 to 300 and more preferably from 3 to 100.

Therefore, it constitutes a further object of the present invention a process for the (co)polymerization of olefins $CH_2=CHR$, in which R is hydrogen or a hydrocarbyl radical with 1-12 carbon atoms, carried out in the presence of a catalyst comprising the product of the reaction between:

(i) the solid catalyst component of the invention;
(ii) an alkylaluminum compound and,
(iii) optionally an electron-donor compound (external donor).

The polymerization process can be carried out according to known techniques for example slurry polymerization using as diluent an inert hydrocarbon solvent, or bulk polymerization using the liquid monomer (for example propylene) as a reaction medium. Moreover, it is possible to carry out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 5 MPa, preferably between 1 and 4 MPa. In the bulk polymerization the operating pressure is generally between 1 and 8 MPa, preferably between 1.5 and 5 MPa.

As already explained, the catalyst of the invention show, in propylene homopolymerization an increased activity/stereospecificity balance particularly due to increased stereospecificity compared with prior art catalysts not containing Zn atoms. It has been also observed that the catalyst of the invention show a particularly interesting behavior also in the copolymerization of propylene with minor amounts of ethylene for the preparation of propylene random copolymers (RACO). Polypropylene random copolymers, in particular propylene-ethylene random copolymers, produced by Ziegler Natta catalysts are known to have a broad ethylene composition distribution because the ethylene units tend to be incorporated by less stereospecific sites. This results in a higher ethylene content in the lower molecular weight and highly stereoirregular polymer chains and in an increase of the o-xylene soluble (XS) fraction.

When the solid catalyst component of the invention is used in copolymerization of propylene with ethylene, a decrease of the amount of XS fraction at similar copolymer composition is found with respect to standard ZN catalysts (FIG. 1), without observing a decrease of catalyst activity. Moreover, the solid catalyst component of the invention also shows an enhanced comonomer incorporation in the crystalline fraction together with an improved intramolecular comonomer distribution of ethylene (FIG. 2). This results in an improved XS vs melting temperature (Tm) balance (FIG. 3). This characteristic allows to produce RACOs for various application in which the problems associated with the relatively high content of xylene soluble fraction are minimized.

The following examples are given in order to better illustrate the invention without limiting it.

Characterizations

Determination of Mg, $Ti_{(TOT)}$ and Zn

The determination of Mg, $Ti_{(TOT)}$ and Zn content in the solid catalyst component has been carried out via inductively coupled plasma emission spectroscopy on "I.C.P Spectrometer ARL Accuris".

The sample was prepared by analytically weighting, in a "Fluxy" platinum crucible", 0.1÷0.3 grams of catalyst and 2 grams of lithium metaborate/tetraborate 1/1 mixture. After addition of some drops of KI solution, the crucible is inserted in a special apparatus "Claisse Fluxy" for the complete burning. The residue is collected with a 5% v/v $HNO_3$ solution and then analyzed via ICP at the following wavelengths: Magnesium, 279.08 nm; Titanium, 368.52 nm; Zinc, 213.86 nm.

Determination of $Ti^{(red)}$ 0.5÷2 g of the sample in powder form are dissolved in 100÷150 ml of HCl 2.7M in the presence of dry ice to create an inert atmosphere. The so obtained solution is then subject to a volumetric titration with a solution of ammonium ferric sulphate 0.1N in water, in the presence of dry ice, using as indicator of the equivalence point ammonium sulfocyanate (25% wt/v water solution). The stoichiometric calculations based on the volume of the titration agent consumed give the weight amount of $Ti^{3+}$ in the sample.

Determination of Internal Donor Content

The determination of the content of internal donor in the solid catalytic compound was done through gas chromatography. The solid component was dissolved in acetone, an internal standard was added, and a sample of the organic phase was analyzed in a gas chromatograph, to determine the amount of donor present at the starting catalyst compound.

Determination of X.I.

2.5 g of polymer and 250 ml of o-xylene were placed in a round-bottomed flask provided with a cooler and a reflux condenser and kept under nitrogen. The obtained mixture was heated to 135° C. and was kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of said xylene-soluble fraction is expressed as a percentage of the original 2.5 grams and then, by difference, the X.I. %.

Polymer Microstructure Analysis

The analysis was carried out on xylene insoluble fractions, about 40 mg of polymer were dissolved in 0.5 ml of 1,1,2,2-tetrachloroethane-d2. $^{13}C$-NMR spectra were acquired at 120° C. on a Bruker AV-600 spectrometer equipped with cryoprobe, operating at 150.91 MHz in the Fourier transform mode. A 90° pulse, 15 seconds of delay between pulses and Composite Pulse Decoupling (CPD, bi_WALTZ_65_64pl sequence) to remove $^1H$-$^{13}C$ coupling were used. About 512 transients were stored in 64K data points with a spectral window of 9000 Hz. The peak of mmmm pentad in the methyl region at 21.80 ppm was used as internal reference. The tacticity was evaluated from integrals of pentads in the methyl region using the microstructure analysis described in literature ("*Studies of the stereospecific polymerization mechanism of propylene by a modified Ziegler-Natta catalyst based on* 125 *MHz 13C n.m.r. spectra*" Y. Inoue, Y. Itabashi, R. Chûjô *Polymer,* 1984, 25, 1640, and "*Two-site model analysis of* 13C *n.m.r. of polypropylene polymerized by Ziegler-Natta catalyst with external alkoxysilane donors*" R. Chûjô, Y. Kogure, T. Väänänen *Polymer,* 1994, 35, 339). The experimental pentad distribution was fitted using the two-site model described in the second reference. In Table 3 only the mmmm pentad of the portion of polymer generated from the "asymmetric bernoullian site" defined according to Chûjô is reported.

$^{13}C$ NMR of Propylene/Ethylene Copolymers $^{13}C$ NMR spectra were acquired on a Bruker AV-600 spectrometer equipped with cryoprobe, operating at 160.91 MHz in the Fourier transform mode at 120° C.

The peak of the $S_{\delta\delta}$ carbon (nomenclature according to "*Monomer Sequence Distribution in Ethylene-Propylene Rubber Measured by* 13C *NMR.* 3. *Use of Reaction Probability Mode*" C. J. Carman, R. A. Harrington and C. E. Wilkes, *Macromolecules,* 1977, 10, 536) was used as internal reference at 29.9 ppm. The samples were dissolved in 1,1,2,2-tetrachloroethane-d2 at 120° C. with a 8% wt/v concentration. Each spectrum was acquired with a 90° pulse, 15 seconds of delay between pulses and CPD to remove $^1H$-$^{13}C$ coupling. 512 transients were stored in 32K data points using a spectral window of 9000 Hz.

The assignments of the spectra, the evaluation of triad distribution and the composition were made according to Kakugo ("*Carbon-13 NMR determination of monomer sequence distribution in ethylene-propylene copolymers prepared with* δ-*titanium trichloride-diethylaluminum chlo-* ride" M. Kakugo, Y. Naito, K. Mizunuma and T. Miyatake, *Macromolecules*, 1982, 15, 1150) using the following equations:

---

PPP = 100 $T_{\beta\beta}$/S    PPE = 100 $T_{\beta\delta}$/S    EPE = 100 $T_{\delta\delta}$/S
PEP = 100 $S_{\beta\beta}$/S    PEE = 100 $S_{\beta\delta}$/S    EEE = 100 (0.25 $S_{\gamma\delta}$ + 0.5 $S_{\delta\delta}$)/S
S = $T_{\beta\beta}$ + $T_{\beta\delta}$ + $T_{\delta\delta}$ + $S_{\beta\beta}$ + $S_{\beta\delta}$ + 0.25 $S_{\gamma\delta}$ + 0.5 $S_{\delta\delta}$

---

The product of reactivity ratio $r_1 r_2$ was calculated according to C. J. Carman ("*Monomer Sequence Distribution in Ethylene-Propylene Rubber Measured by 13C NMR. 3. Use of Reaction Probability Model*" C. J. Carman, R. A. Harrington and C. E. Wilkes, *Macromolecules*, 1977, 10, 536)

Owing to overlaps in the methyl region between peaks due to stereo sequences and Ethylene containing ones, tacticity of Propylene sequences was not evaluated at the pentad level but was calculated at a triad level in the methine region as $PPP_{mm}$ content. The ratio of the integral of mm-$T_{\beta\beta}$ peak (28.90-29.65 ppm) and the integral of the whole $T_{\beta\beta}$ region (29.80-28.37 ppm) was calculated according to the following equation:

ββββ
the structures of the relative sequences are represented below:

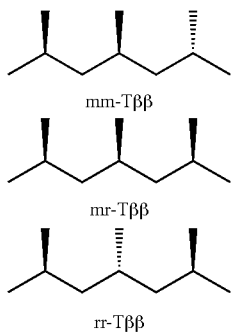

The distribution of ethylene in the insoluble fraction was evaluated as fraction of isolated ethylene units according to the following equation:

[PEP]/[E]=[PEP]/[PEP+EEE+PEE]

Melt Flow Rate (MFR)

The melt flow rate MIL of the polymer was determined according to ISO 1133 (230° C., 2.16 Kg).

Flexural Modulus

The flexural modulus of the polymer was determined according to ISO 178. Experimental values are reported in Table 3.

Melting Temperature Via Differential Scanning Calorimetry (DSC)

The melting points of the polymers (Tm) were measured by Differential Scanning calorimetry (D.S.C.) on a Perkin Elmer DSC-1 calorimeter, previously calibrated against indium melting points. The weight of the samples in every DSC crucible was kept at 6.0±0.5 mg.

In order to obtain the melting point, the weighted sample was sealed into aluminium pans and heated to 200° C. at 10° C./minute. The sample was kept at 200° C. for 2 minutes to allow a complete melting of all the crystallites, then cooled to 5° C. at 10° C./minute. After standing 2 minutes at 5° C., the sample was heated for the second time to 200° C. at 10° C./min. In this second heating run, the peak temperature was taken as the melting temperature following examples are given in order to further describe and not to limit the present invention.

EXAMPLES

In the Procedure for the Preparation of the Milled Solid Catalyst Component

Magnesium dichloride anhydrous, di-isobutylphthalate in amounts such to meet the Mg/DIBP molar ratio of 17 were introduced into a four ball mill together with a zinc compound of the type and in an amount as indicated in Table 1. The components were milled together at room temperature for 6 h. The resulting solid catalyst precursors were treated with an excess of $TiCl_4$: the temperature was raised to 100° C. and maintained for 2 h. Thereafter, stirring was stopped, the solid product was allowed to settled and the supernatant liquid was siphoned off at 100° C. After the supernatant was removed, additional fresh $TiCl_4$ was added to reach the initial liquid volume again. The mixture was then heated at 120° C. and kept at this temperature for 1 hour. Stirring was stopped again, the solid was allowed to settle and the supernatant liquid was siphoned off. The solid was washed with anhydrous hexane six times in temperature gradient down to 60° C. and one time at room temperature. The obtained solid was then dried under vacuum and analyzed.

Procedure for the Preparation of the Spherical Adduct

Microspheroidal $MgCl_2.pC_2H_5OH$ adduct was prepared according to the method described in Example 2 of WO98/44009, but operating on larger scale and optionally adding in suitable amounts a zinc compound of the type and in an amount as indicated in Tables 2 and 4.

Procedure for the Preparation of the Phthalate-Based Solid Catalyst Component from the Spherical Adduct Into a 500 ml round bottom flask, equipped with mechanical stirrer, cooler and thermometer 300 ml of $TiCl_4$ were introduced at room temperature under nitrogen atmosphere. After cooling to 0° C., while stirring, diisobutyl phthalate and 9.0 g of the spherical adduct (prepared as described above) were sequentially added into the flask. The amount of charged internal donor was such to meet an Mg/donor molar ratio of 8. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at temperature in the range of 120° C. and kept at this temperature for 1 hour. Stirring was stopped again, the solid was allowed to settle and the supernatant liquid was siphoned off. The solid was washed with anhydrous hexane six times in temperature gradient down to 60° C. and one time at room temperature. The obtained solid was then dried under vacuum and analyzed.

Procedure for the Preparation of the Diether-Based Solid Catalyst Component from the Spherical Adduct Into a 500 ml round bottom flask, equipped with mechanical stirrer, cooler and thermometer 300 ml of $TiCl_4$ were introduced at room temperature under nitrogen atmosphere. After cooling to 0° C., while stirring, 9,9-bis(methoxymethyl)fluorene and 9.0 g of the spherical adduct (prepared as described above) were sequentially added into the flask. The amount of charged internal donor was such to meet an Mg/donor molar ratio of 6. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at temperature in the range of 110° C. and kept at this temperature for 1 hour. Stirring was stopped again, the solid was allowed to settle and the supernatant liquid was siphoned off. The solid was washed with anhydrous hexane six times in temperature gradient down to 60° C. and one time at room temperature. The obtained solid was then dried under vacuum and analyzed.

Procedure for the Preparation of Solid Catalyst Components from the Spherical Adduct with Different Internal Donors Into a 500 ml round bottom flask, equipped with mechanical stirrer, cooler and thermometer 300 ml of $TiCl_4$ were introduced at room temperature under nitrogen atmosphere. After cooling to 0° C., while stirring, the internal donor and 9.0 g of the spherical adduct (prepared as described above) were sequentially added into the flask. The amount of charged internal donor was such to meet an Mg/donor molar ratio in the range of 7÷8 depending on donor structure. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at temperature in the range of 120° C. and kept at this temperature for 1 hour. Stirring was stopped again, the solid was allowed to settle and the supernatant liquid was siphoned off. The solid was washed with anhydrous hexane six times in temperature gradient down to 60° C. and one time at room temperature. The obtained solid was then dried under vacuum and analyzed.

General Procedure for the Polymerization of Propylene

A 4-liter steel autoclave equipped with a stirrer, pressure gauge, thermometer, catalyst feeding system, monomer feeding lines and thermostating jacket, was purged with nitrogen flow at 70° C. for one hour. A suspension containing 75 ml of anhydrous hexane, 0.76 g of $AlEt_3$ (6.66 mmol), 0.33 mmol of external donor and 0.006÷0.010 g of solid catalyst component, previously precontacted for 5 minutes, was charged. Either dicyclopentyldimethoxysilane, D donor, or cyclohexylmethyldimethoxysilane, C donor, were used as external donor as specified in Tables 1-3; some tests were carried out without any external donor (Table 4). The autoclave was closed and the desired amount of hydrogen was added (in particular, 2 NL in D donor tests, 1.5 NL in C donor tests and 1.25 NL in tests without external donor were used). Then, under stirring, 1.2 kg of liquid propylene was fed. The temperature was raised to 70° C. in about 10 minutes and the polymerization was carried out at this temperature for 2 hours. At the end of the polymerization, the non-reacted propylene was removed; the polymer was recovered and dried at 70° C. under vacuum for 3 hours. Then the polymer was weighed and characterized.

Examples 1-6 and Comparative Examples C1 and C2

The milled solid catalyst components were prepared using the general method described above. Their composition and related propylene polymerization performance are indicated in Table 1.

Examples 7-18 and Comparative Examples C3-C9

The solid catalyst components were prepared from spherical adducts $MgCl_2.pC_2H_5OH$ using the general method described above. Their composition and related propylene polymerization performance are indicated in Tables 2-4.

Examples 19-23 and Comparative Examples C10 and C11: Propylene/Ethylene Copolymerization A 4-liter steel autoclave equipped with a stirrer, pressure gauge, thermometer, catalyst feeding system, monomer feeding lines and thermostating jacket, was purged with nitrogen flow at 70° C. for one hour. Then, at 30° C. under propylene flow (0.5 bar), a suspension containing 75 ml of anhydrous hexane, 0.76 g of $AlEt_3$, 0.063 g of cyclohexylmethyldimethoxysilane (C donor) and 0.004±0.010 g of solid catalyst component, previously precontacted for 5 minutes, was charged. The autoclave was closed; subsequently hydrogen was added (1.5-1.8 L) to target MIL (230° C., 2.16 Kg)=3-4 g/10'. Then, under stirring, 1.2 kg of liquid propylene together with the required amount of ethylene (4-11 g) was fed during the raising of temperature from 30 up to 70° C. The temperature was raised to 70° C. in about 10-15 minutes and the polymerization was carried out at this temperature for two hours and ethylene was fed during the polymerization. At the end of the polymerization, the non-reacted monomers were removed; the polymer was recovered and dried at 70° C. under vacuum for three hours. Then the polymer was weighed and characterized. Experimental data related propylene/ethylene copolymerizations are reported in Table 5.

Examples 24-30 and Comparative Examples C12-C18

The solid catalyst components were prepared from spherical adducts $MgCl_2.pC_2H_5OH$ using the general method described above. Their composition and related propylene polymerization performance are indicated in Table 6.

TABLE 1

Milled solid catalyst components

| | Milling Conditions | | Solid Catalyst Component | | | | Polymerization | |
|---|---|---|---|---|---|---|---|---|
| | Zn compound | Zn/Mg % mol | Mg % wt. | Ti % wt. | Zn % wt. | DIBP % wt. | ED type | Mileage Kg/g | XI % wt. |
| Ex. 1 | ZnO | 0.3 | 21.1 | 1.9 | 0.2 | 7.1 | C | 29 | 97.2 |
| Ex. 2 | | 0.5 | 22.1 | 1.4 | 0.3 | 4.8 | D | 43 | 98.2 |
| Ex. 3 | | 1.2 | 21.5 | 1.5 | 0.7 | 6.1 | C | 33 | 97.7 |
| Ex. 4 | | 2.1 | 21.8 | 1.3 | 1.0 | 4.8 | D | 42 | 98.1 |
| Ex. 5 | $ZnCl_2$ | 0.5 | 22.3 | 1.4 | 0.3 | 5.2 | D | 40 | 98.1 |
| Ex. 6 | | 1.2 | 21.4 | 1.7 | 0.6 | 5.6 | C | 38 | 97.3 |
| C1 | none | — | 20.6 | 2.1 | — | 6.8 | C | 32 | 96.8 |
| C2 | | | | | | | D | 39 | 97.6 |

DIBP = diisobutyl phthalate

TABLE 2

Phthalate-based solid catalyst components from spherical adducts

| | Support synthesis | | Support composition | | EtOH/ | Solid catalyst component | | | | Polymerization | | |
|---|---|---|---|---|---|---|---|---|---|---|---|---|
| | Zn type | Zn/Mg % mol | Mg % wt | Zn % wt | Mg m.r. | Mg % wt | Ti % wt | Zn % wt | DIBP | ED | Act. Kg/g | XI % wt |
| Ex. 7 | ZnO | 0.5 | 10.6 | 0.15 | 2.8 | 18.8 | 2.4 | 0.31 | 11.5 | D | 97 | 99.1 |
| Ex. 8 | | 1.0 | 10.1 | 0.25 | 2.9 | 19.8 | 2.1 | 0.51 | 12.0 | C | 77 | 98.1 |
| Ex. 9 | | 2.0 | 8.9 | 0.45 | 3.1 | 19.1 | 2.1 | 1.05 | 11.2 | D | 101 | 99.0 |
| Ex. 10 | | 3.0 | 9.3 | 0.75 | 2.9 | 19.8 | 1.9 | 1.70 | 6.9 | C | 71 | 98.1 |
| Ex. 11 | | 5.0 | 9.7 | 1.25 | 2.8 | 19.7 | 1.3 | 2.83 | 7.6 | D | 80 | 98.8 |
| Ex. 12 | ZnCl$_2$ | 1.0 | 10.5 | 0.20 | 3.0 | 18.7 | 2.7 | 0.51 | 10.0 | C | 66 | 98.1 |
| Ex. 13 | | 2.0 | 10.4 | 0.45 | 2.9 | 19.0 | 2.0 | 0.92 | 11.5 | D | 87 | 98.9 |
| C3 | None | — | 10.3 | — | 2.9 | 18.8 | 2.9 | — | 13.6 | D | 96 | 98.3 |
| C4 | | | | | | | | | | C | 83 | 97.6 |
| C5 | ZnCl$_2$ | 10.0 | 9.8 | 2.2 | 3.1 | 19.2 | 1.0 | 4.7 | 7.4 | D | 21 | 98.3 |
| C6 | | | | | | | | | | C | 15 | 97.6 |
| Ex. 14 | ZnO | 1.0 | 11.6 | 0.29 | 2.3 | 18.8 | 2.4 | 0.51 | 11.8 | C | 65 | 98.3 |
| C7 | none | — | 12.2 | — | 2.1 | 19.6 | 2.8 | — | 10.3 | C | 67 | 97.6 |

TABLE 3

Flexural modulus of polypropylenes from phthalate-based catalysts

| PP Ex. No | Zn compound | Zn/Mg % mol | ED type | mmmm XI (%) | Flexural Modulus N/mm$^2$ |
|---|---|---|---|---|---|
| Ex. 9 | ZnO | 2.0 | D | 98.6 | 1840 |
| Ex. 10 | | 3.0 | C | 96.9 | 1660 |
| C3 | none | — | D | 98.3 | 1740 |
| C4 | | | C | 96.1 | 1490 |

TABLE 4

Diether-based solid catalyst components from spherical adducts

| | Support Synthesis | | Support Composition | | Solid Catalyst Component | | | | | Polymerization | | |
|---|---|---|---|---|---|---|---|---|---|---|---|---|
| | Zn type | Zn/Mg % mol | Mg % wt. | Zn % wt. | EtOH/ Mg m.r. | Mg % wt. | Ti % wt. | Zn % wt. | Diether % wt. | ED type | Act. Kg/g | XI % wt. |
| Ex. 15 | ZnO | 1.0 | 10.1 | 0.25 | 2.9 | 15.1 | 4.6 | 0.42 | 16.4 | no ED | 141 | 96.4 |
| Ex. 16 | | 2.0 | 10.0 | 0.45 | 2.8 | 15.3 | 4.0 | 0.85 | 15.4 | D | 76 | 98.8 |
| Ex. 17 | ZnCl$_2$ | 2.0 | 10.4 | 0.45 | 2.9 | 15.1 | 4.2 | 0.74 | 15.1 | D | 95 | 98.6 |
| Ex. 18 | | | | | | | | | | no ED | 150 | 96.9 |
| C8 | none | — | 10.2 | — | 3.0 | 14.3 | 5.5 | — | 16.4 | D | 84 | 98.2 |
| C9 | | | | | | | | | | no ED | 143 | 96.0 |

Diether = 9,9-bis(methoxymethyl)fluorine

TABLE 5

Propylene-ethylene copolymerization with phthalate-based solid catalyst components of Table 2

| | Solid Catalyst | Mileage kg/g | XI wt % | NMR | | | DSC |
|---|---|---|---|---|---|---|---|
| Example | Component | | | E wt % | E$_{XI}$ wt % | [PEP]/[E]$_{XI}$ | Tm$_{II\ run}$ ° C. |
| Ex. 19 | Ex. 8 | 100.5 | 95.3 | 2.5 | 1.83 | 0.920 | 150.0 |
| Ex. 20 | Ex. 9 | 90.6 | 95.6 | 2.5 | 1.93 | 0.911 | 148.8 |
| Ex. 21 | Ex. 9 | 103.3 | 92.0 | 4.2 | 2.90 | 0.877 | 141.7 |
| Ex. 22 | Ex. 9 | 160.2 | 88.4 | 5.1 | 3.64 | 0.865 | 138.3 |
| Ex. 23 | Ex. 13 | 79.2 | 93.1 | 3.8 | 2.73 | 0.885 | 143.3 |
| C10 | C3 | 82.6 | 93.2 | 3.0 | 2.08 | 0.887 | 148.0 |
| C11 | C3 | 93.9 | 79.8 | 6.2 | 4.17 | 0.827 | 137.0 |

TABLE 6

Solid catalyst components from spherical adducts with different internal donors

| | Support Synthesis | | Support Composition | | | Solid Catalyst Component | | | | | Polymerization | | |
|---|---|---|---|---|---|---|---|---|---|---|---|---|---|
| | Zn type | Zn/Mg % mol | Mg % wt. | Zn % wt. | EtOH/ Mg m.r. | Internal donor name | Mg % wt. | Ti % wt. | Zn % wt. | ID % wt. | ED | Act. Kg/g | XI % wt. |
| Ex. 24 | ZnO | 1.6 | 10.4 | 0.40 | 2.9 | Di-n-hexyl 3,3-dimethyl glutarate | 19.2 | 2.1 | 0.81 | 11.2 | D | 73 | 98.9 |
| Ex. 25 | | | | | | | | | | | C | 43 | 98.1 |
| C12 | none | — | 10.6 | — | 2.9 | | 17.4 | 3.0 | — | 14.7 | D | 60 | 97.9 |
| C13 | | | | | | | | | | | C | 46 | 97.1 |
| Ex. 26 | ZnO | 1.6 | 12.4 | 0.55 | 2.1 | Di-n-hexyl 3,3-dimethyl glutarate | 20.4 | 1.8 | 0.87 | 7.7 | D | 58 | 98.6 |
| Ex. 27 | | | | | | | | | | | C | 44 | 97.8 |
| C14 | none | — | 12.5 | — | 2.1 | | 18.6 | 2.7 | — | 13.1 | D | 55 | 98.0 |
| C15 | | | | | | | | | | | C | 46 | 97.3 |
| Ex. 28 | ZnO | 1.0 | 9.3 | 0.20 | 3.1 | Diethyl 2-isopropyl malonate | 20.6 | 1.7 | 0.55 | 11.6 | D | 35 | 98.1 |
| Ex. 29 | | | | | | | | | | | C | 29 | 97.2 |
| C16 | none | — | 10.8 | — | 2.8 | | 19.4 | 3.0 | — | 11.9 | D | 28 | 97.4 |
| C17 | | | | | | | | | | | C | 22 | 95.9 |
| Ex. 30 | ZnO | 1.0 | 9.3 | 0.20 | 3.1 | Meso diethyl 2,3-diisopropyl succinate | 19.4 | 2.6 | 0.49 | 11.4 | D | 56 | 97.3 |
| C18 | none | — | 10.8 | — | 2.8 | | 18.9 | 3.3 | — | 11.6 | D | 54 | 96.7 |

We claim:

1. A catalyst for the (co)polymerization of olefins $CH_2=CHR$, in which R is a hydrocarbyl radical with 1-12 carbon atoms, optionally in mixture with ethylene, having a solid catalyst component having an average diameter of 5-150 μm, wherein the solid catalyst component comprises Ti, a Zn compound, $MgCl_2$, and an electron donor compound, wherein more than 50% of titanium atoms are in a +4 valence state, wherein an amount of Zn ranges from 0.1 to 4% by weight based on a total weight of solid catalyst component, and wherein the Zn compound is selected from Zn halide, Zn carbonate, Zn acetate, Zn nitrate, Zn oxide, Zn sulfate or Zn sulfide.

2. The catalyst of claim 1, wherein the amount of Zn ranges from 0.2 to 3.5% by weight based on the total weight of solid catalyst component.

3. The catalyst of claim 1, wherein a Zn/Mg molar ratio ranges from 0.001 to 0.05.

4. The catalyst of claim 1, wherein an amount of Ti ranges from 1.1 to 2.5% wt.

5. The catalyst of claim 1, wherein the electron donor compound is selected from esters, ethers, amines, silanes and ketones or mixtures thereof.

6. The catalyst of claim 1, wherein the electron donor compound is selected from the group consisting of alkyl and aryl esters of optionally substituted aromatic mono or polycarboxylic acids, esters of malonic acids, esters of glutaric acids, esters of succinic acids, esters of maleic acids and 1,3-diethers of the formula (II):

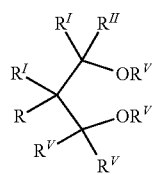

(II)

wherein R, $R^I$, $R^{II}$, $R^{III}$, $R^{IV}$ and $R^V$ equal or different from each other, are hydrogen or hydrocarbon radicals having from 1 to 18 carbon atoms, and $R^{VI}$ and $R^{VII}$, equal or different from each other, have the same meaning of $R$-$R^V$ except that they cannot be hydrogen; one or more of the $R$-$R^{VII}$ groups can be linked to form a cycle.

7. The catalyst of claim 1, wherein the electron donor compound is selected from the group consisting of the (S,S), (R,R) or meso forms of the succinates of formula (I) below:

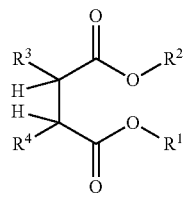

in which the radicals $R^1$ and $R^2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R^3$ and $R^4$ equal to, or different from, each other, are $C_1$-$C_{20}$ alkyl, cycloalkyl, aryl, arylalkyl or alkylaryl group, optionally containing heteroatoms with the proviso that at least one $R^3$ and $R^4$ is a branched alkyl.

8. The catalyst of claim 1, wherein a final amount of electron donor compound in the solid catalyst component ranges from 1 to 25% by weight.

9. The catalyst of claim 1, wherein the Zn compound is selected from Zn oxide and Zn dichloride.

10. The catalyst of claim 1, wherein the Zn compound is Zn carbonate.

11. The catalyst of claim 1, wherein the Zn compound is Zn acetate.

12. The catalyst of claim 1, wherein the Zn compound is Zn nitrate.

13. The catalyst of claim 1, wherein the Zn compound is Zn sulfate.

14. The catalyst of claim 1, wherein the Zn compound is Zn sulfide.

15. The catalyst of claim 1, comprising a product obtained by contacting:
   (i) the solid catalyst component,
   (ii) an alkylaluminum compound, and
   (iii) optionally an external electron donor compound.

16. The catalyst according to claim 15, wherein the alkylaluminum compound (ii) is a trialkylaluminum compound.

17. The catalyst according to claim 15, wherein the external donor compound is selected from a silicon compound of formula $(R_6)_a(R_7)_b Si(OR_8)_c$, where a and b are integers from 0 to 2, c is an integer from 1 to 4 and the sum (a+b+c) is 4; $R_6$, $R_7$, and $R_8$, are alkyl, cycloalkyl or aryl radicals with 1-18 carbon atoms optionally containing heteroatoms.

\* \* \* \* \*